(12) United States Patent
Gusler et al.

(10) Patent No.: US 7,494,048 B2
(45) Date of Patent: Feb. 24, 2009

(54) SYSTEM AND METHOD FOR BRAND NAME GIFT CARD EXCHANGE

(75) Inventors: Carl Phillip Gusler, Austin, TX (US); Rick Allen Hamilton, Charlottesville, VA (US); Steven Jay Lipton, Flower Mound, TX (US); Timothy Moffett Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 729 days.

(21) Appl. No.: 10/821,134

(22) Filed: Apr. 8, 2004

(65) Prior Publication Data
US 2005/0228717 A1    Oct. 13, 2005

(51) Int. Cl.
*G07F 19/00*    (2006.01)

(52) U.S. Cl. ..................................................... 235/379
(58) Field of Classification Search .................. 235/379
See application file for complete search history.

(56) References Cited

U.S. PATENT DOCUMENTS

2006/0037835 A1*  2/2006  Doran et al. ................. 194/302
2007/0005685 A1*  1/2007  Chau et al. ................... 709/203

* cited by examiner

*Primary Examiner*—Karl D. Frech
(74) *Attorney, Agent, or Firm*—Carr LLP; D'Ann N. Rifai

(57) ABSTRACT

The present invention provides for exchanging a gift card. Data associated with a first gift card is provided. The data associated with the first gift card is validated. Either a money rebate associated with the first gift card, or a second gift card is selected. The first gift card is exchanged for either a money rebate or the second gift card. An exchange fee is generated by both the vendor associated with the gift card and the company performing the exchange.

11 Claims, 3 Drawing Sheets

SYSTEM AND METHOD FOR BRAND NAME GIFT CARD EXCHANGE

TECHNICAL FIELD

The present invention relates generally to electronic commerce and, more particularly, to the exchange of gift cards.

BACKGROUND

Many consumers have received gift cards, also known as gift certificates, from different stores, especially franchises, for Christmas, birthdays, anniversaries, and so forth. Sometimes these gift cards are welcome, and sometimes they are for stores and shopping boutiques that the recipient/consumer does not wish to frequent. In many instances, these gift cards tend to "burn a hole" in the pocket of the consumer, as the consumer looks for a way to use the card, whether or not the consumer needs or desires anything from those particular stores. Furthermore, if these cards are redeemed for cash, they are typically redeemed at the store of the card issuer, necessitating an unwanted trip by the consumer.

Therefore, there is a need to exchange or redeem gift cards in a manner that addresses at least some of the problems associated with conventional gift card redemptions or exchanges.

SUMMARY OF THE INVENTION

The present invention provides for exchanging a gift card. Data associated with a first gift card is provided. The data associated with the first gift card is validated. Either a money rebate associated with the first gift card, or a second gift card is selected. The first gift card is exchanged for either a money rebate or the second gift card.

BRIEF DESCRIPTION OF THE DRAWINGS

For a more complete understanding of the present invention, and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

In the remainder of this description, a processing unit (PU) may be a sole processor of computations in a device. In such a situation, the PU is typically referred to as an MPU (main processing unit). The processing unit may also be one of many processing units that share the computational load according to some methodology or algorithm developed for a given computational device. For the remainder of this description, all references to processors shall use the term MPU whether the MPU is the sole computational element in the device or whether the MPU is sharing the computational element with other MPUs, unless otherwise indicated.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
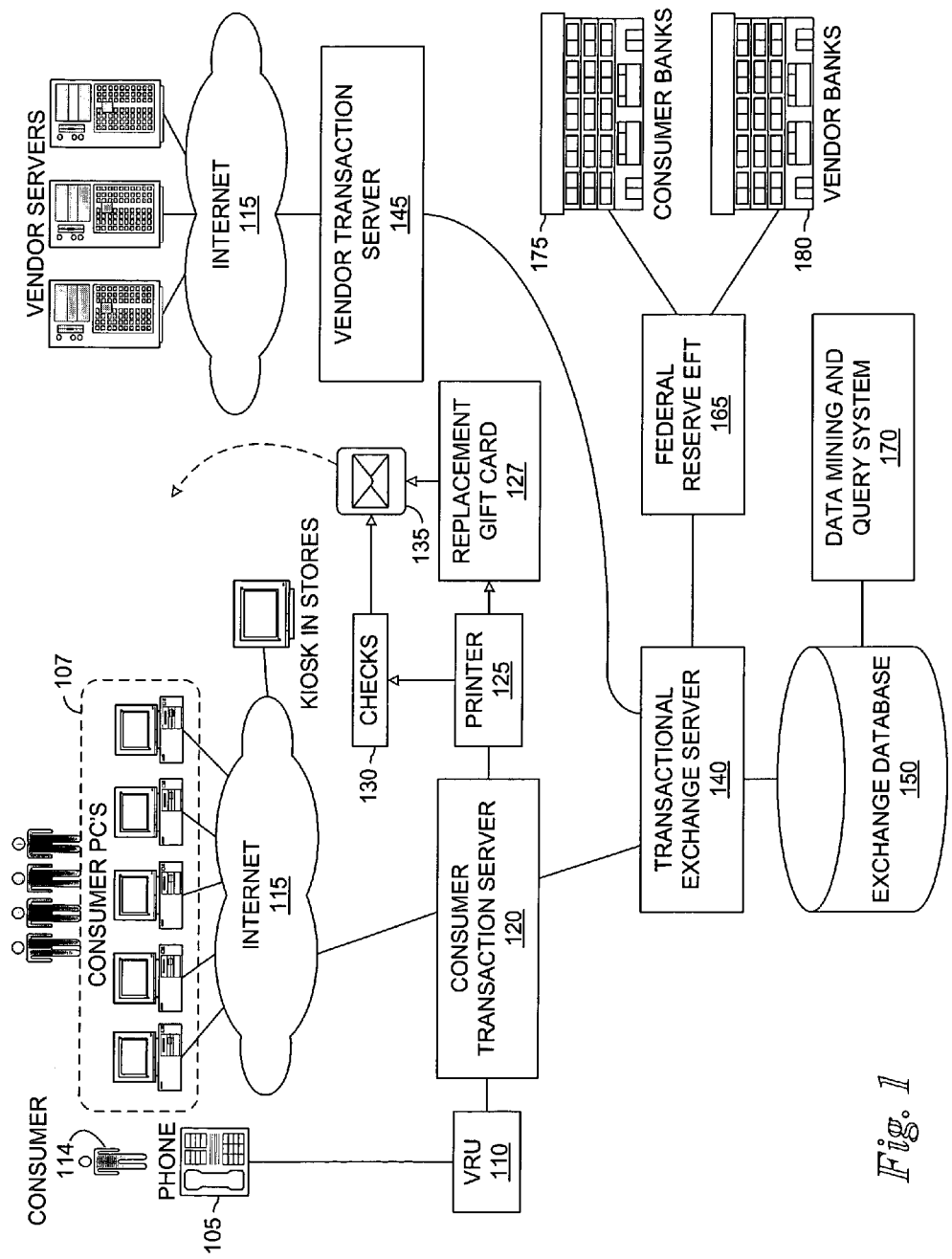
FIG. 1 schematically depicts a system for electronically exchanging or redeeming gift cards.

Turning to FIG. 1, disclosed a system 100 in which gift card redemption can occur. The redemption can occur in the form of an exchange of a gift card for another gift card, or the exchange of a gift card for money. The gift card transaction typically occurs through an electronic or optical medium, such as through accessing the Internet, DTMF telephone signals, information entered into an ATM, and so on. In a further embodiment, the gift card for one store can be exchanged for the gift card of another store. This also typically occurs through an electronic medium, such as through accessing the Internet, DTMF telephone signals, information entered into an ATM, and so on.

The system 100 generally incorporates "business to business" (B2B) and "business to consumer" (B2C) technologies to provide the business participants of the B2B with new marketing opportunities, and provides consumers with new customer satisfaction services. Generally, the B2B exchange will either instigate the partial refund of a gift card, for a fee, or the B2B exchange will issue another gift card for a participating vendor, minus a transaction fee.

In the system 100, a plurality of consumer personal computers (PCs) 107 are employed by consumers 114. Alternatively, the consumers 114 can use a phone 105. The PCs are coupled to Internet 115, and the phone 105 is coupled to a voice response unit (VRU) 110. Both the Internet 115 and the VRU 110 are coupled to a consumer transaction server (CTS) 120. The transaction exchange server (TES) 140 is coupled to a vendor transaction server (VTS) 145, an exchange database 150, and Federal Reserve Electronic Funds Transfer (EFT) 165. The Internet 115 is further coupled to a plurality of vendor servers. The exchange database 150 is coupled to a data mining and query system 170. The federal EFT 165 is coupled to a plurality of consumer banks 175, 180.

The system 100 can work substantially as follows. The consumer 114 can either phone or interact with the Internet through consumer PC's 107 or through the employment of a Kiosk/ATM machine in a store. The consumer 114 wishes to either exchange the original gift card for another gift card, or have a check issued and mailed or otherwise have a credit issued to his account. The consumer 114 also inputs his or her checking or banking information and/or mailing address, or the name of another gift card brand for which the consumer 114 selects to have the present gift card swapped.

The consumer transaction server 120 receives the consumer's request. The consumer transaction server 120 forwards the request to the transaction exchange server 140, which accesses the exchange database 150 to determine whether the card brand type is a valid card brand type (that is, whether it is supported, such as a "Borders Bookstore" or "WalMart" card). The transaction exchange server 140 accesses the vendor transaction server 145 to verify that a card to be exchanged is individually a valid card, that is, whether it has a valid identification number. If it is valid, the vendor transaction server 145 releases the equivalent of the value of the card, minus a transaction fee, to the transaction exchange server 140. The transactional exchange server 140 can either request that the Federal Reserve EFT 165 transfer funds from the vendor banks 180 to the consumer banks 175. Alternatively, the server 140 can order a printer 125 to issue a check 130 to be sent through the US mail 135 to the consumer. Alternatively, a replacement card 127 can be sent through the US mail 135.

In the system 100, the vendor transaction server 145, when allowing its card to be exchanged or cashed, would typically charge a fee for this, for instance 2% of the face value of the card. Then, the transaction exchange server 140 would charge an additional fee, say 8% of the face gift card amount, to send a check directly to the consumer, or 6% to exchange the original gift card for another gift card. The exchange of cards can happen as described in the following.

The consumer 114 inputs the card to which he or she wishes to exchange, as well as the identification number on the original card. The transaction exchange server 140 gets the release of the credit from the original vendor, as described above. However, the transaction exchange server then authorizes another exchange to another card, minus a transaction fee for the exchange. For instance, a "Borders Book Store" could be exchanged for a "WalMart" card. The original vendor takes its cut, such as 2%, and credits the B2B exchange, such as at the TES 140, with the remaining amount of cash. The TES 140 then requests that the second vendor authorize a second gift card for its own brand.

In a further embodiment, the exchanges made over the TES 140 could be monitored to aid in the determination of marketing trends. For instance, the exchange database 150 could record information pertinent to each gift card exchange, such as the brand name associated with the issued card, the amount of money of the gift card, the date that the card was issued, the date that the gift card was exchanged, the zip code of the consumer making the exchange, whether money or another gift card was requested in the exchange, and if so, what the brand name the card was switched to, and so on. Then, this information is requested or searched for by the data mining and query system 170 to look for patterns or other pieces of information of merit for use by marketers to determine the buying patterns/exchange patterns of consumers. In the system 100, this can be performed by the data mining and query system 170, but other means to perform data mining is within the scope of the present invention.

Figure 2A:
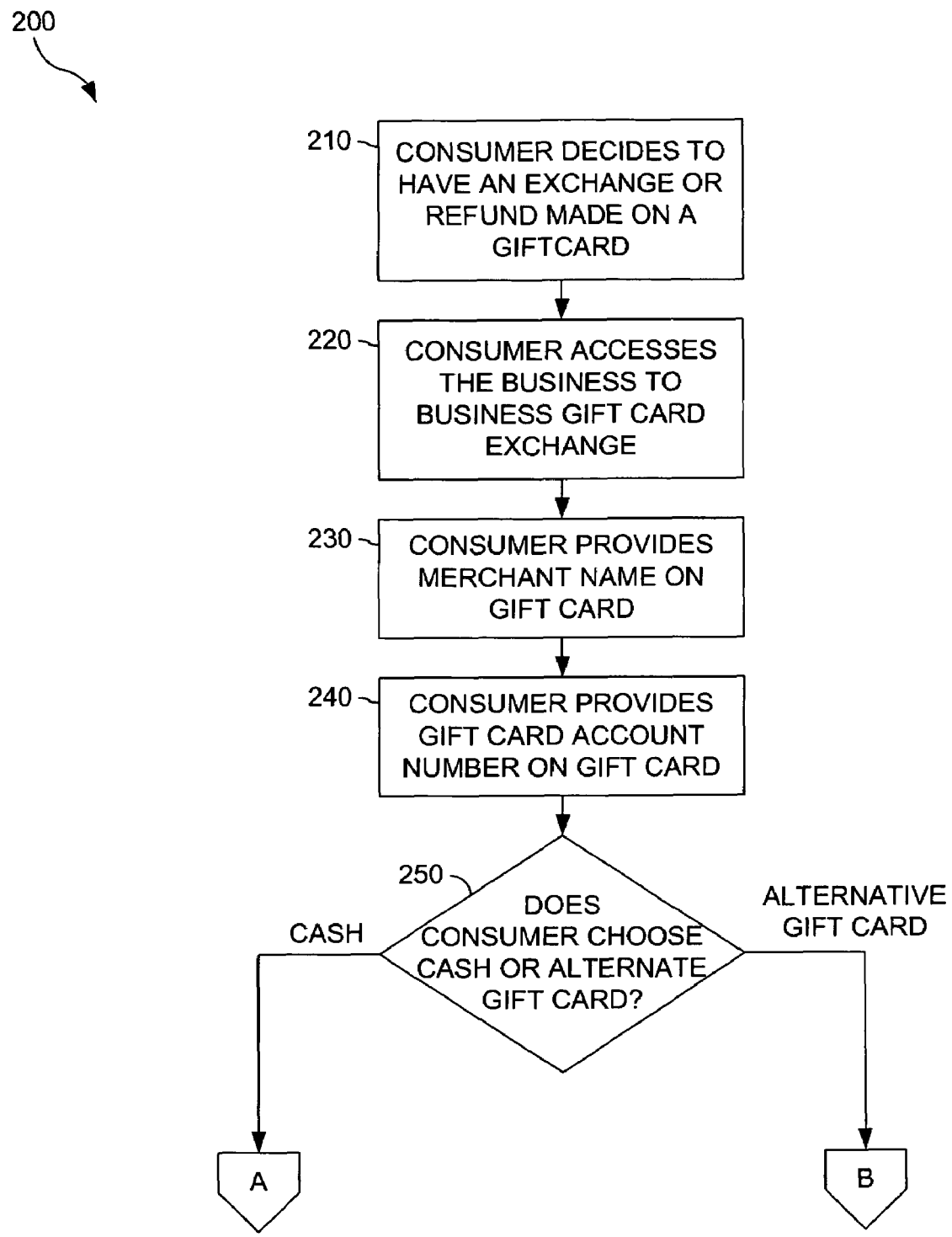
FIGS. 2A and 2B illustrate a method for electronically exchanging or redeeming gift cards.
Figure 2B:
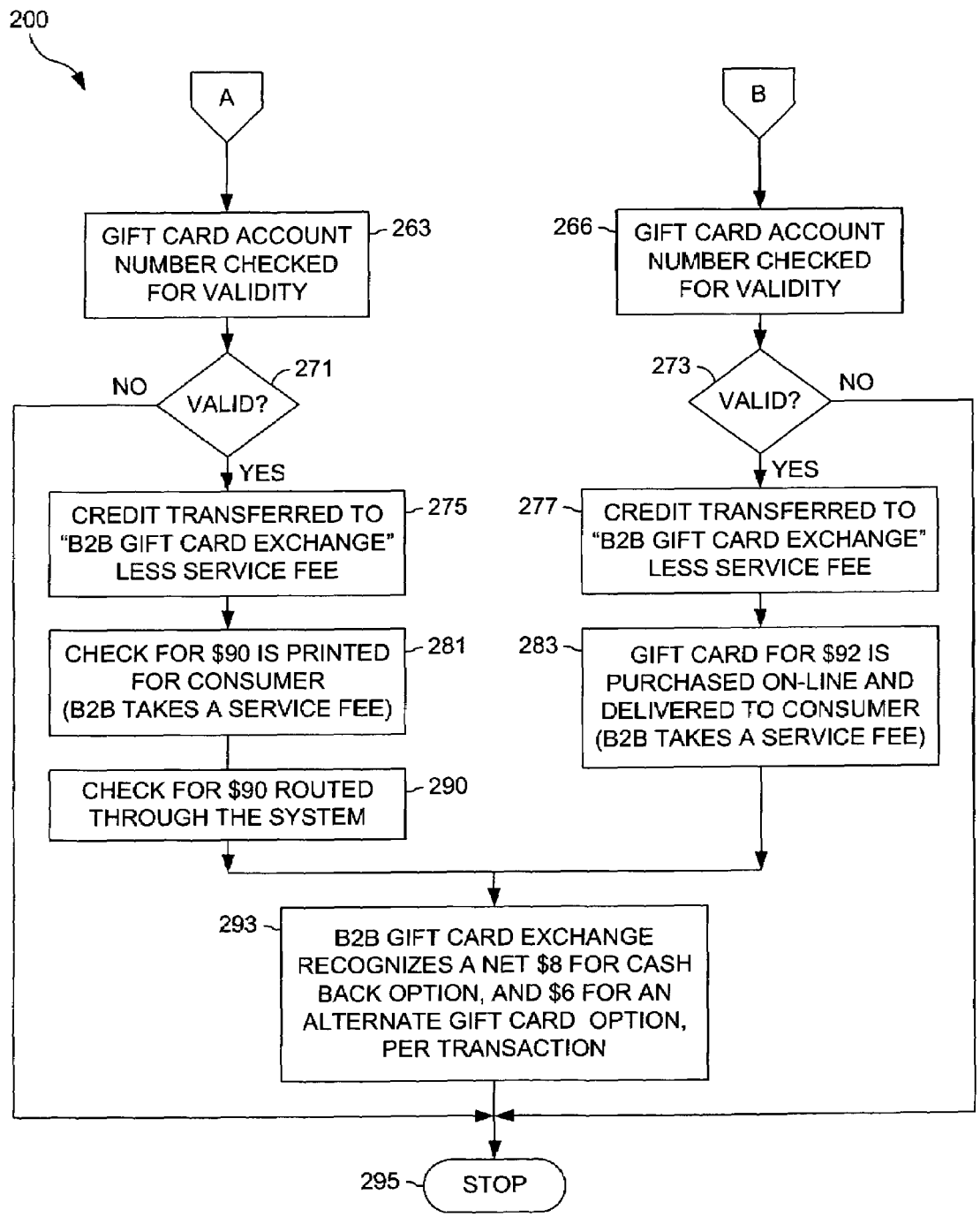

Turning now to FIGS. 2A and 2B, illustrated is a method 200 for exchanging or refunding a gift-card. In step 210, the consumer decides that an exchange or refund is warranted. In step 220, the consumer accesses the B2B gift card exchange. This can be through the Internet, through DTMF tones, through an ATM machine, or other information exchange mechanism.

In step 230, the consumer provides the merchant name on the gift card, and in step 240, the consumer provides the gift card account number on the gift card. In step 250, the system 100 queries the consumer as to whether he or she wishes to get cash, or another gift card. If the consumer chooses cash, the gift card account number is checked for validity in step 263. If the card is found to be not valid in step 271, then the flow stops in step 295. If the flow is valid, then credit is transferred from the named merchant to the "B2B Gift Card Exchange" in step 275, less a service fee originated by the vendor, such as a $2.00 fee. In step 281, a check, such as for $90 is printed for a consumer, or a credit of $90 is generated for the consumer. The B2B charges a transaction fee for converting the gift credit to a form usable by the consumer is generated, such as $8.00. In step 290, the check or credit for the refund is routed through the system. In step 293, the B2B exchange recognizes an $8.00 profit for a cash back option. Alternatively, a kiosk is used to either receive gift cards/gift card information, and/or to output a new gift card or the equivalent cash amount. Generally, the consumer provides the information as detailed above to the kiosk, and the kiosk can also issue either the cash, a check, credit a checking or savings account, or an alternative gift card. The method 200 stops in step 295.

Alternatively, in step 250, if the consumer chooses an alternative gift card instead of the cash back option, the gift card account number is checked for validity in step 266. If the card is not valid in step 273, then the flow stops in step 295. In the flow is valid, then credit is transferred from the named merchant to the "B2B Gift Card Exchange" in step 277, less a service fee originated by the vendor, such as a $2.00 fee. In step 283, the selected second gift card for $92.00 is purchased on line, and is mailed or otherwise bestowed upon the consumer. (The B2B takes a service fee of $6.00, for example). Alternatively, the kiosk is used to either and/or receive gift cards/gift card information, and to output a new gift card or the equivalent cash amount. Generally, the consumer provides the information as detailed above to the kiosk, and the kiosk can also issue either the cash, a check, credit a checking or savings account, or an alternative gift card.

In step 293, the B2B exchange recognizes a $6.00 profit for the exchange of gift card option. The method flow 200 stops in step 295.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A method of exchanging a gift card, comprising:
providing data associated with a first gift card;
validating the data associated with the first gift card;
selecting either a money rebate associated with the first gift card, or a second gift card;
exchanging the first gift card for either a money rebate or the second gift card; and
charging a first service fee for issuing the second gift card.

2. The method of claim 1, wherein providing data further comprises providing a merchant name.

3. The method of claim 1, wherein providing data further comprises providing an account number.

4. The method of claim 1, further comprising charging a second service fee for issuing the money amount.

5. The method of claim 1, wherein providing the data associated with the gift card occurs with employment of a kiosk.

6. The method of claim 1, wherein providing the data associated with the gift card occurs with employment of a personal computer.

7. The method of claim 1, further comprising releasing funds associated with the first gift card by a vendor.

8. The method of claim 7, further comprising charging a third service fee for releasing funds associated with the first gift card by the vendor.

9. The method of claim 1, further comprising issuing the money by mail.

10. The method of claim 1, further comprising correlating the exchange of the gift card with at least one other piece of data.

11. The method of claim 10, wherein the step of correlating consists of at least one of the group of the trade name of the associated second gift card, the time of the exchange, and the type of consumer transaction device.

* * * * *

(12) EX PARTE REEXAMINATION CERTIFICATE (10060th)
United States Patent
Gusler et al.

(10) Number: US 7,494,048 C1
(45) Certificate Issued: Feb. 27, 2014

(54) SYSTEM AND METHOD FOR BRAND NAME GIFT CARD EXCHANGE

(75) Inventors: Carl Phillip Gusler, Austin, TX (US); Rick Allen Hamilton, Charlottesville, VA (US); Steven Jay Lipton, Flower Mound, TX (US); Timothy Moffett Waters, Hiram, GA (US)

(73) Assignee: Cardpool, Inc., San Francisco, CA (US)

Reexamination Request:
No. 90/012,883, Jun. 5, 2013

Reexamination Certificate for:
Patent No.: 7,494,048
Issued: Feb. 24, 2009
Appl. No.: 10/821,134
Filed: Apr. 8, 2004

(51) Int. Cl.
*G07F 19/00* (2006.01)
(52) U.S. Cl.
USPC .................................................. 235/379

(58) Field of Classification Search
None
See application file for complete search history.

(56) References Cited

To view the complete listing of prior art documents cited during the proceeding for Reexamination Control Number 90/012,883, please refer to the USPTO's public Patent Application Information Retrieval (PAIR) system under the Display References tab.

*Primary Examiner* — Jeffrey Carlson

(57) ABSTRACT

The present invention provides for exchanging a gift card. Data associated with a first gift card is provided. The data associated with the first gift card is validated. Either a money rebate associated with the first gift card, or a second gift card is selected. The first gift card is exchanged for either a money rebate or the second gift card. An exchange fee is generated by both the vendor associated with the gift card and the company performing the exchange.

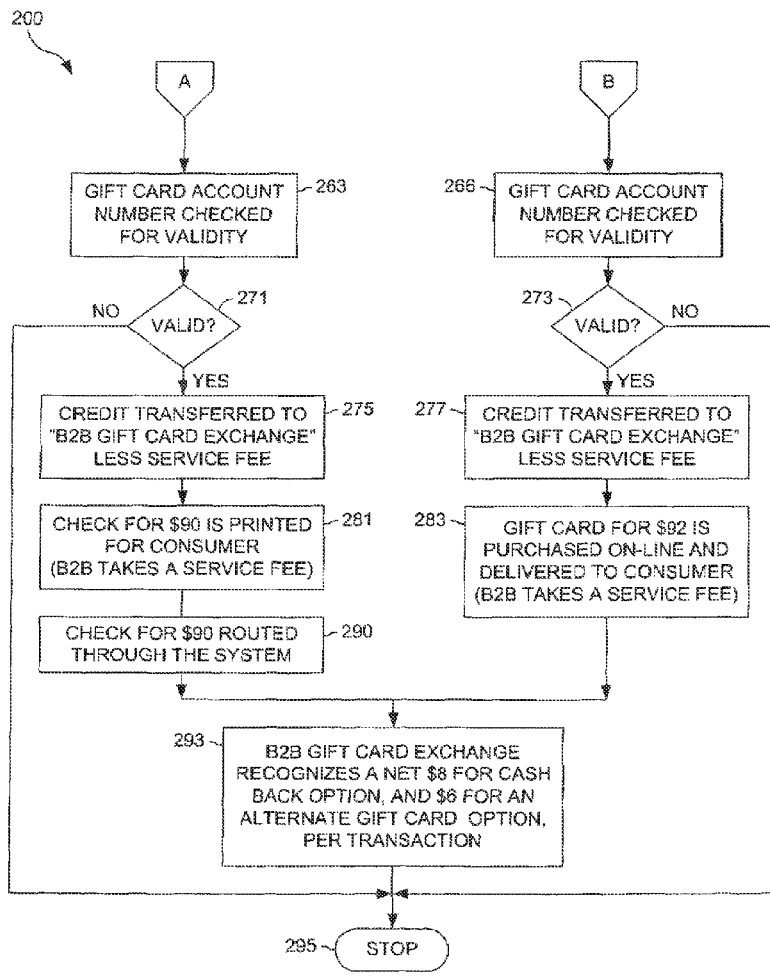

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-7 and 9-11, dependent on an amended claim, are determined to be patentable.

New claims 12-52 are added and determined to be patentable.

Claim 8 was not reexamined.

1. A *computer-implemented* method of exchanging a gift card *using a processor of an electronic gift card exchange, the processor including a computer program comprising computer program code*, the method comprising:
   receiving, *at the electronic gift card exchange, a request for a gift card exchange;*
   receiving, *at the electronic gift card exchange, identification of a first brand type of a first gift card;*
   providing, *in association with the request,* data associated with [a] *the* first gift card;
   *determining whether the first brand type is a valid card brand type included among a plurality of brand types supported by the electronic gift card exchange;*
   validating, *responsive to the request,* the data associated with the first gift card, *the validating being performed by the processor in accordance with the computer program code and including verifying that the first gift card is a valid card*;
   selecting either a money rebate associated with the first gift card, or a second gift card *of a second brand type included among the plurality of brand types supported by the electronic gift card exchange*;
   exchanging, *in response to a determination that the first brand type is a valid card brand type and the verifying that the first gift card is a valid card,* the first gift card for either a money rebate or the second gift card, *the exchanging being performed by the processor in accordance with the computer program code*; and
   *charging a first service fee for issuing the second gift card, the charging being performed by the processor in accordance with the computer program code.*

12. The method of claim 1 wherein the providing the data is performed by the processor in accordance with the computer program code.

13. The method of claim 1 wherein the providing the data is performed by a consumer input device.

14. The method of claim 1 wherein the selecting is performed by the processor in accordance with the computer program code.

15. The method of claim 1 wherein the selecting is performed by a consumer input device.

16. The method of claim 1 wherein the selecting is based upon a request sent by a kiosk.

17. The method of claim 1 wherein the selecting is based upon a request sent by a consumer input device 18. The method of claim 1 wherein the selecting is based upon a request received from a consumer transaction server.

19. The method of claim 1 wherein the providing is performed by a transaction server and wherein the processor is included within a transaction exchange server coupled to the transaction server.

20. The method of claim 1 wherein the receiving the request to exchange is received over a network.

21. The method of claim 20 further including receiving, from over the network, the data associated with the first gift card.

22. The method of claim 20 wherein the request includes information relating to the second gift card.

23. The method of claim 22 wherein the information includes brand information comprising the second brand type.

24. The method of claim 22 wherein the validating includes validating the information relating to the second gift card.

25. The method of claim 1 further including recording, in a database, information pertinent to the exchanging the first gift card wherein the information includes whether the money rebate or the second gift card was selected.

26. The method of claim 1 wherein the data associated with the first gift card includes an indication of a brand name of the first gift card, the method further including recording, in a database, the indication of the brand name of the first gift card and an indication of a brand name of the second gift card.

27. The method of claim 1 wherein the data associated with the first gift card includes an indication of an amount of the first gift card, the method further including recording, in a database, an indication of the date of the exchanging and the indication of the amount of the first gift card.

28. The method of claim 1 further including recording, in a database, information pertinent to the exchanging the first gift card wherein the information includes an indication of a location of a consumer initiating the exchanging.

29. The method of claim 1 wherein credit is transferred to the electronic gift card exchange based upon the verifying.

30. The method of claim 1 wherein the exchanging further includes issuing a request to transfer funds relating to the first gift card.

31. The method of claim 29 wherein the charging a first service fee is performed subsequent to transfer of the credit to the electronic gift card exchange.

32. The method of claim 1 wherein the request includes an identification number of the first gift card.

33. The method of claim 1 wherein the request comprises a request to exchange the first gift card of the first brand type for the second gift card of the second brand type.

34. The method of claim 1, wherein the selecting is performed in response to a query generated by the electronic gift card exchange subsequent to the providing.

35. The method of claim 29 wherein the authorizing occurs subsequent to the transfer of the credit.

36. The method of claim 1 wherein the exchanging includes exchanging the first gift card of the first brand type for credit, the authorizing including authorizing exchange of the credit to the second gift card of the second brand type.

37. The method of claim 1 wherein the gift card transaction occurs through the internet where the processor of the electronic gift card exchange interacts with a consumer personal computer to conduct the gift card exchange.

38. A computer-implemented method of exchanging a gift card, the method comprising:

receiving, at an electronic gift card exchange, a request for a gift card exchange; receiving, at the electronic gift card exchange, identification of a first brand type of a first gift card;

providing, through the consumer input device, data associated with the first gift card; determining whether the first brand type is a valid card brand type included among a plurality of brand types supported by the electronic gift card exchange;

validating, responsive to the request, the data associated with the first gift card, the validating being performed by a processor in accordance with computer program code and including verifying that the first gift card is a valid card;

selecting, rising input from the consumer input device, either a money rebate associated with the first gift card, or a second gift card of a second brand type included among the plurality of brand types supported by the electronic gift card exchange;

exchanging, in response to a determination that the first brand type is a valid card brand type and the verifying that the first gift card is a valid card, the first gift card for the second gift card, the exchanging being performed by the processor in accordance with the computer program code; and charging a first service fee for issuing the second gift card, the charging being performed by the processor in accordance with the computer program code.

39. The method of claim 38 wherein the gift card transaction occurs through the internet where the processor of the electronic gift card exchange interacts with a consumer personal computer to conduct the gift card exchange and wherein the second gift card of the second brand type is selected from a plurality of gift cards of different card brand types.

40. In a system including a consumer transaction server coupled to a transaction exchange server, a method of exchanging a gift card, the method comprising:

receiving a request for a gift card exchange;
receiving identification of a first brand type of a first gift card;
providing, using the consumer transaction server, data associated with the first gift card including the first brand type of the first gift card;
determining whether the first brand type is a valid card brand type included among a plurality of brand types stored within an exchange database;
validating, responsive to the request and using the transaction exchange server, the data associated with the first gift card including verifying that the first gift card is a valid card;
selecting either a money rebate associated with the first gift card, or a second gift card of a second brand type included among the plurality of brand types;
exchanging, using the transaction exchange server and in response to a determination that the first brand type is a valid card brand type and the verifying that the first gift card is a valid card, the first gift card for either a money rebate or the second gift card; and
charging a first service fee for issuing the second gift card.

41. The method of claim 40 wherein the gift card transaction occurs through the internet where the processor of the electronic gift card exchange interacts with a consumer personal computer to conduct the gift card exchange.

42. A computer-implemented method of exchanging a gift card using a processor of an electronic gift card exchange, the processor including a computer program comprising computer program code, the method comprising:

providing, to the electronic gift card exchange, a request for a gift card exchange;
providing, to the electronic gift card exchange, identification of a first brand type of a first gift card and data associated with the first gift card;
determining whether the first brand type is a valid card brand type included among a plurality of brand types supported by the electronic gift card exchange;
validating, responsive to the request, the data associated with the first gift card to be exchanged, the validating being performed by the processor in accordance with the computer program code and including verifying that the first gift card is a valid card;
selecting either a money rebate associated with the first gift card, or a second gift card of a second brand type included among the plurality of brand types, the selecting being performed by the processor in accordance with the computer program code and the transaction request
exchanging, in response to a determination that the first brand type is a valid card brand type and the verifying that the first gift card is a valid card, the first gift card for either a money rebate or the second gift card, the exchanging being performed by the processor in accordance with the computer program code; and
charging a first service fee for issuing the second gift card, the charging being performed by the processor in accordance with the computer program code.

43. The method of claim 42 wherein the providing the transaction request and the data is performed by the processor in accordance with the computer program code.

44. The method of claim 42 wherein the providing the transaction request and the data is performed by a consumer input device.

45. The method of claim 42 wherein the transaction request and the data are received from a consumer transaction server and wherein the providing includes providing the transaction request and the data to the processor.

46. The method of claim 42 wherein the transaction request is received from a consumer transaction server.

47. The method of claim 42 further including receiving, from over a network, the transaction request.

48. The method of claim 47 further including receiving, from over the network, the data associated with the first gift card.

49. The method of claim 48 wherein the request includes information relating to the second gift card.

50. The method of claim 49 wherein the information includes brand information.

51. The method of claim 49 wherein the validating includes validating the information relating to the second gift card.

52. The method of claim 42 wherein the gift card transaction occurs through the internet where the processor of the electronic gift card exchange interacts with a consumer personal computer to conduct the gift card exchange.

\* \* \* \* \*